(12) United States Patent
Clinch

(10) Patent No.: US 9,350,859 B1
(45) Date of Patent: *May 24, 2016

(54) STORY DELIVERY SYSTEM AND METHOD FOR MOBILE ENTERTAINMENT

(71) Applicant: Catherine B. Clinch, Los Angeles, CA (US)

(72) Inventor: Catherine B. Clinch, Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/339,082

(22) Filed: Jul. 23, 2014

Related U.S. Application Data

(63) Continuation-in-part of application No. 14/059,199, filed on Oct. 21, 2013, now Pat. No. 8,792,622, which is a continuation-in-part of application No. 12/819,026, filed on Jun. 18, 2010, now Pat. No. 8,565,387.

(60) Provisional application No. 61/269,020, filed on Jun. 19, 2009.

(51) Int. Cl.
*H04M 11/00* (2006.01)
*H04M 3/493* (2006.01)

(52) U.S. Cl.
CPC ........ *H04M 3/493* (2013.01); *A63F 2300/5593* (2013.01); *A63F 2300/8094* (2013.01)

(58) Field of Classification Search
CPC ............ H04M 3/493; H04M 3/53333; H04M 2201/60; H04M 2203/50
USPC ......................................... 379/88.13, 202.01
See application file for complete search history.

(56) References Cited

U.S. PATENT DOCUMENTS

| | | | |
|---|---|---|---|
| 2002/0010584 A1 | 1/2002 | Schultz et al. | |
| 2004/0140989 A1* | 7/2004 | Papageorge | H04W 4/14 715/700 |
| 2005/0116956 A1* | 6/2005 | Beardow | H04M 1/72547 345/473 |
| 2007/0155510 A1* | 7/2007 | Galvin | G06F 21/64 463/43 |

(Continued)

OTHER PUBLICATIONS

Wendy Kaufman; "Cell Phones Transform into Multipurpose Entertainment Units"; Listen Morning Edition; May 2, 2005; 3 pages.

(Continued)

*Primary Examiner* — Van D Huynh
(74) *Attorney, Agent, or Firm* — David L. Hoffman; Hoffman Patent Group

(57) ABSTRACT

A method of delivering a story for engaging a user in an interactive, scripted, virtual reality story by generating calls from a group of actors or personalities called a clique, includes the steps of recording onto a memory device a series of calls by multiple persons who pretend to be friends of a user recipient; making calls using the recorded calls in a predetermined sequence to a user recipient and preferably displaying; telling a story in the first person perspective from multiple points of view by means of the calls; and doing everything real friends do when they communicate with each other, except these friends are fictional, rather than real. A system for engaging a user in an interactive, scripted, virtual reality story by generating calls from a group of actors or personalities called a clique, where the calls simulate everything real friends do when they communicate with each other, except these friends are fictional, rather than real. In the method and system, the calls may be made to a smart phone. In addition, the smart phone may download an application and may download a call via phone lines and/or other wireless signal, and simulate the call or be an actual phone call.

20 Claims, 18 Drawing Sheets

(56) References Cited

U.S. PATENT DOCUMENTS

2007/0233744 A1    10/2007   Piccionelli et al.
2008/0254424 A1*   10/2008   Cohen .................... G09B 7/00
                                                         434/308

OTHER PUBLICATIONS

Greg Bluestein; Associated Press; "Want drama? Enter virtual soap opera"; Associated Press; Jun. 11, 2007; 4 pages.

Frank Rose; "Secret Websites, Coded Messages: The New World of Immersive Games"; Wired Magazine, Issue16.01; Dec. 20, 2007; 13 pages.

"Mobile VideoJukeBox: Video on Demand now on your mobile"; TXT Polymedia S.P.A.; Mar. 10, 2008; 1 page.

"Premium-rate telephone number"; Wikipedia; Oct. 21, 2010; 16 pages.

"Wake Up with Snoozester Wake Up Calls"; www.Snoozester.com/wake-up-calls.snooze; Nov. 25, 2010; 3 pages.

* cited by examiner

FIG. 5

TABLE DEPICTING SAMPLES CONTENT/CLIQUE MEMBER INTERRELATEDNESS AND TIMING OF CLIQUE A CALLS - DAY ONE — 70

| CLIQUE MEMBER | 12 NOON | 1:00 PM | 2:00 PM | 3:00 PM | 4:00 PM | 5:00 PM | 6:00 PM | 7:00 PM | 8:00 PM | 9:00 PM | 10:00 PM |
|---|---|---|---|---|---|---|---|---|---|---|---|
| A1 | INTRO TO SCRIPT | | | | | USER | | | | | USER |
| A2 | | OFFER OF ADVICE ON A1 | | | | DOES | | | | | DOES |
| A3 | | | COM- PLAINS ABOUT A1 + A2 | | INTRO- DUCES A4 | NOT | | | | | NOT |
| A4 | | | | | | PERMIT | QUEST- IONS ABOUT A3 | WARNS ABOUT A2 | | | PERMIT |
| A5 | | | | | | CALLS | | | ASKS TO BE TOLD STORY OF A4 | | CALLS |

STORY DELIVERY SYSTEM AND METHOD FOR MOBILE ENTERTAINMENT

CROSS-REFERENCE TO RELATED APPLICATION(S)

This application claims priority from and is a continuation in part of U.S. Utility patent application Ser. No. 14/059,199, filed Oct. 21, 2013, becoming U.S. Pat. No. 8,792,622, which is a continuation in part of U.S. Utility patent application Ser. No. 12/819,026, filed Jun. 18, 2010, now U.S. Pat. No. 8,565,387, which is a nonprovisional of U.S. Provisional Patent Application Ser. No. 61/269,020 filed Jun. 19, 2009, and which are all incorporated by reference herein.

BACKGROUND OF THE INVENTION

1. Field of the Invention

The present invention relates to a system and method for delivering a story for mobile entertainment.

2. Description of Related Art

In the current model of mobile entertainment, the user is a passive observer. The user initiates access to the mobile entertainment in the same way they turn on a television or type a URL into the address bar of an online search engine. In the mobile space, the user seeking to access an entertainment service must dial up and solicit use of the site through search engines like Google®, Yahoo®, MSN®, or another intermediary. Once the users reach the mobile entertainment site, they gain access to programming that is repurposed from original source material that was designed and developed for another media (such as film or TV). In other words, the story content is not indigenous to the mobile phone. It can exist—whether in the mobile form or in another form, on any and all other media platforms. The entertainment material is delivered to the user and presented in the same way as presented in that other media, i.e., continuously.

In U.S. Published Patent Application No. 2002/0010584, there is an interactive voice communication method and system for information and entertainment. A real or authored personality records a message, and a user may dial in or connect to a service that plays the recording, e.g. via telephone, and a video, CD, DVD, Internet, stand-alone kiosk, wireless device, or other device. In the system and method, the user calls in or contacts the real (e.g., celebrity) or authored personality and asks a question, and the celebrity or personality answers. This is user-initiated, involves a single contact, is not a story, and is embodied in essentially any medium. The information is responsive to commonly asked questions of a celebrity.

Other systems involving phone calls are wake-up call systems where a user registers in advance for a call in the morning (or other time of day) as a wake-up call or reminder. The call is made and does not deliver a story.

SUMMARY OF THE INVENTION

This story delivery system offers entertainment programming that is unique and indigenous to the mobile phone. This story delivery system flips the model around. The entertainment program has multiple characters that call a user at various times throughout the day to deliver a story from their specific point of view. The user can choose a range of times during which they will receive the calls, or, the user can leave the time of the call up to the program which means that the characters will call unexpectedly, just like friends, colleagues and service providers call at a random time of their choosing. This process enables the story to be delivered to the user in exactly the same way that true stories (aka conversations) are delivered in real life. Rather than passively observe a story that is delivered in a third-person omniscient narrative, content that is created and developed for this story delivery system enables physical and emotional interaction between the user and the characters.

Story plot points and character arcs are delivered in the course of conversations between the users (consumer) and the characters who speak to the users as if they were old, trusted friends, or as characters who are connected in a tangible way to the characters who act as the user's old, trusted friends.

We form bonds and attachments to other human beings. These bonds enhance the quality of our emotional lives. They enable us to feel as if we are part of a larger community beyond the boundaries of family—part of a community we have chosen to participate in. We enjoy receiving calls from trusted friends and loved ones with whom we have established that emotional bond. Consequently, this inventive story delivery system removes the user from the role of passive observer and enables them to become an emotional participant in the story as it unfolds. This creates a level of emotional "stickiness" whereby the user will feel compelled to continue to participate in the story delivery system because of the emotional satisfaction that comes through vicarious emotional experience that is realized through the unfolding of the story. The characters are speaking directly to the user which equates to a familial bond.

The group nature of the participation in these stories will extend to the users in their daily lives as they are able to discuss their "conversations" with the characters who are calling them through the story delivery system. Subsequent bonds can develop between users in real life as they discuss their opinions and "relationships" with the characters who call them through the story delivery system. The shape of episodes is restructured from the traditional "scene" to a stand alone "exposition" of one character who presents one or more plot points from his/her unique point of view without interruption or contradiction.

Even though episodes are sequential, some characters may not be up to date on all events or plot points in the story. This reflects real life scenarios where all members of a social group may or may not be operating under an equal flow of information. This also enables the user to feel a sense of superior understanding over one or more of the characters, and to experience a range of emotions that correspond to that sense of superior understanding.

In a further preferred embodiment, there is a method for delivering a story by engaging a user in an interactive, scripted, virtual reality story by generating calls from a group of actors or personalities called a clique, and the method includes the steps of recording a series of calls by multiple persons (typically each call by one of the persons but can be by two or more) who act like friends of a user recipient; a user selects or signs up for the calls in a selected story or script; the system makes the calls using the recorded calls in a predetermined sequence to the user recipient over a period of time, e.g., the course of a day or days; the calls telling a story in the first person perspective from multiple points of view; and the calls involving doing everything real friends do when they communicate with each other, except these friends are fictional, rather than real.

In another embodiment, there is a system for engaging a user in an interactive, scripted, virtual reality story by generating calls from a group of actors or personalities called a clique, having a memory for storing a series of calls by multiple persons who pretend to be friends of a user recipient; a mechanism for communicating with the memory for making calls using the recorded calls in a predetermined sequence to the user recipient; a mechanism for receiving the series of calls, wherein the series of calls tell a story in the first person perspective from multiple points of view; and the calls simulate everything real friends do when they communicate with each other, except these friends are fictional, rather than real.

In a further embodiment, there is a method and system for delivering, via mobile phone, land phone with display, or other receiver capable of displaying an image, a series of audio and video segments which are portions of a script or story. The script or story represents all the elements of a compelling story told to the user through a "group of friends" that place scripted calls to the user such calls preferably being pre-recorded and stored and then made to the user on a schedule preferably selected by the user. The script is made to include the user in a virtual group of friends called a clique. The clique consists of at least two members, although five is the optimal number. Any number of friends is possible but at some point the number creates an increasing obstacle to the coherency of the script. The scripted calls offer the user a sense of social inclusion and/or a brief escape from routine. A user is a recipient of phone calls from the clique. There can be one user per clique or multiple users. Since this will be a subscription service, potentially millions of people will be accessing each program simultaneously.

In a further embodiment, the mobile phone is a smart phone and the system and method include a smart phone application which the user downloads. The smart phone application initiates the calls and tells the story through the calls.

In another embodiment, at sign up or subsequently, users can opt into a geo-location feature. This feature will enable the series producers to know the general geographic location of each of their users who opt in. The users can opt into this feature at any point in the series by changing their settings to allow it. The users can also opt out of this feature at any point in the series by changing the settings to not allow it.

The capacity for geo-location provides the opportunity to transform the mobile relationship into a LIVE experience where one or more users can have direct contact with one or more of the characters in the series. This can happen on either a one time basis or enable an ongoing series of events. It can also include a LIVE Stream to every other user during the event.

If national (or regional) sponsors can determine that there is a critical mass of users in the area where their product, store or service is available, they can host a LIVE event.

The option can be used to create unique on-on-one or small group experiences.

BRIEF DESCRIPTION OF DRAWINGS

FIG. 5 is a table depicting the content interrelation and timing of calls received by a user;

DESCRIPTION OF THE PREFERRED EMBODIMENT(S)

In one embodiment, there is a method for delivering, via mobile phone, land phone with display, or other receiver capable of displaying an image, a series of audio and video segments which are portions of a script. The script represents all the elements of a compelling story told to the user through a "group of friends" that place scripted calls to the user such calls preferably being pre-recorded and stored and then made to the user on a schedule preferably selected by the user. The script is made to include the user in a virtual group of friends called a clique. The clique consists of at least two members, although five is the optimal number. Any number of friends is possible but at some point the number creates an increasing obstacle to the coherency of the script. The scripted calls offer the user a sense of social inclusion and/or a brief escape from routine. A user is a recipient of phone calls from the clique. There can be one user per clique or multiple users. Since this will be a subscription service, millions of people will be accessing each program simultaneously.

Figure 1:
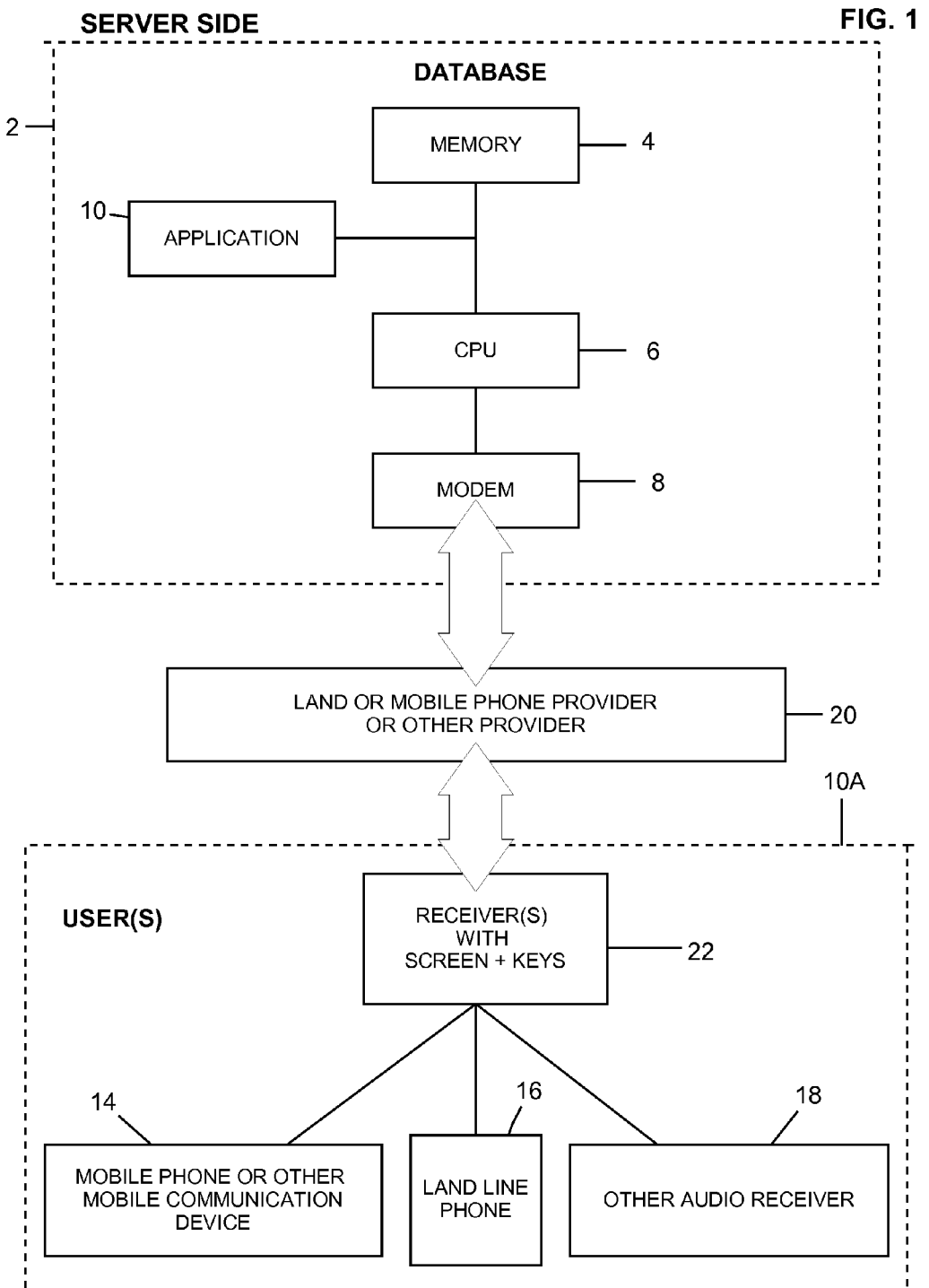
FIG. 1 is a schematic diagram of an embodiment of the inventive system.

As illustrated in FIG. 1, on a server side 2, a database is stored in a memory 4 and contains scripts for various cliques. The scripts contain all of the audio and/or audio with video necessary to tell a story to a user. The audio and video stored in memory includes all data for calls, including recorded messages, text messages, photographs, videos and/or other screen images which are appropriate to the script.

On a user side 10A, the user can receive the script passively by receiving the audio and video input without any influence on what input is received, or any control over the outcome of the clique script. Alternatively, the user can receive the script interactively by choosing to receive some audio and video stored in the memory and not other audio and video stored in the memory, thus affecting the outcome of the script. While the scripts for each clique have multiple associated audio and video clips, each clique may have a varying number, e.g., depending on the complexity of the script and number of clique members. The scripts contain recorded segments (calls) in a predetermined order, but user interactivity may vary the order and thus provide choice among multiple predetermined orders, or possible orders. The calls are made to a phone number. In the script, text messages, picture messages, video messages may be interspersed and thus would have been stored as part of the script in memory 4.

The scripted calls are preferably stored on digital media of memory 4 and delivered by a central processing unit (CPU) 6, via modem 8 (or other transmission initiating device) in accordance with an application 10 (programmed control) to a user's individual mobile phone 14, land phone 16 with display, or other receiver 18 capable of displaying an image or not. Such other device could be any device capable of receiving a phone call with or without video display, e.g., a tablet computer (which may or may not include a "phone"). However, the same concept works with basic audio calls on any phone, including traditional land lines. The call is delivered by a land or mobile phone provider or other provider (e.g., internet service provider) 20 to anyone of the receiver(s) 22. The "keys" on some receiving devices, such as smart phones and/or tablets are often electronic, i.e., touch screen keys. The user may use one, all, or some combination of these devices to receive the scripted calls. Each scripted set of calls (i.e., the calls for each clique of friends) may be stored by a unique identifier, and here each set of calls is represented by a clique 24 (stored in memory) e.g., a clique A, clique B, clique C and so on to clique "N." See FIG. 2. The "calls" (recorded segments) are delivered to the user preferably through use of a phone number (or numbers).

Figure 2:
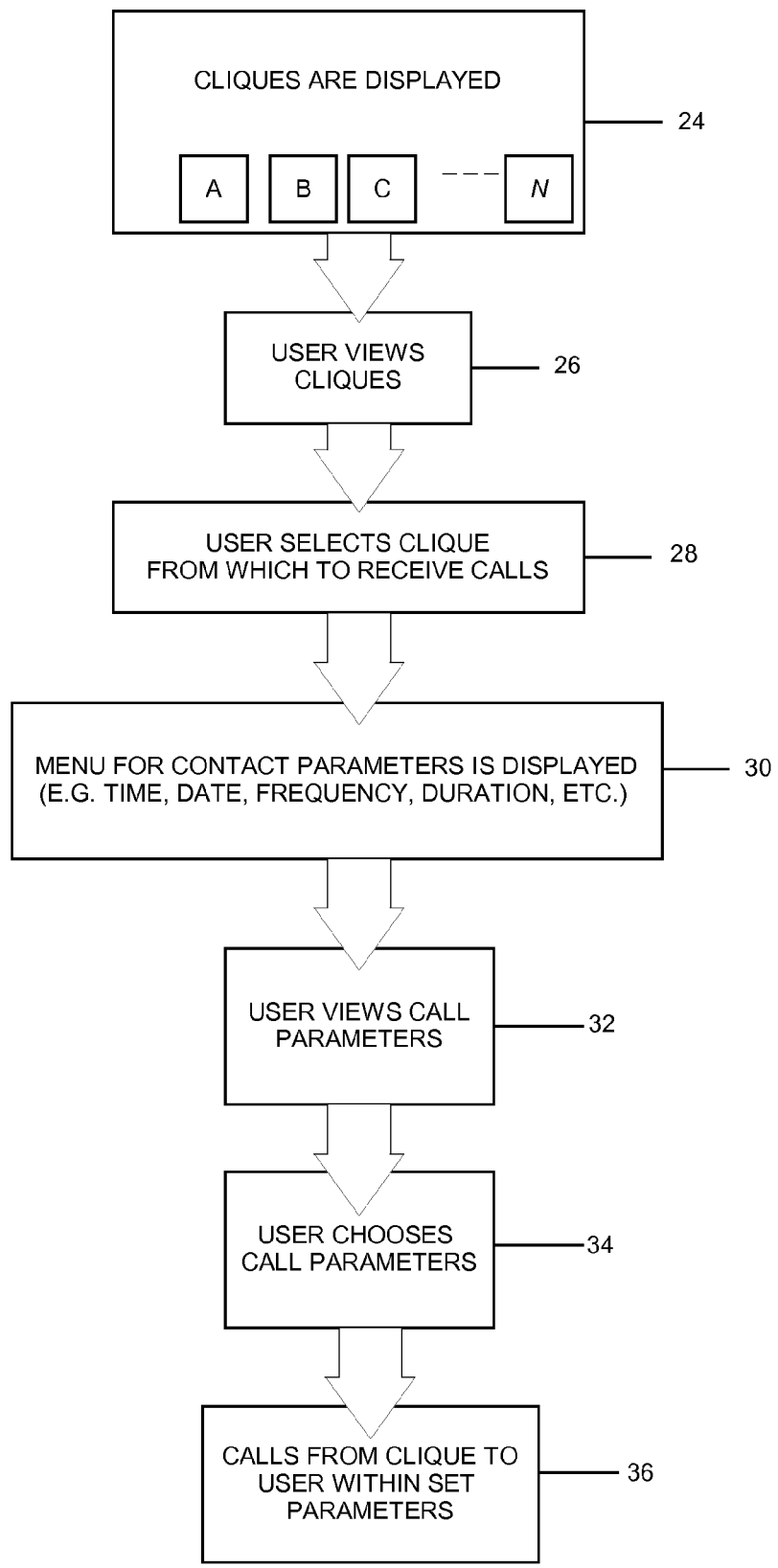
FIG. 2 is a schematic diagram of an embodiment of a user side selection module.

As also seen in FIG. 2, the user participates in a selection module to select the clique and to set call parameters. At set-up, the system displays several cliques (e.g. all of A to n either at one time or at successive times) at step 24 to the user. The user has a choice of cliques based on various factors including, but not limited to, age, gender, personality, and/or an issue or topic. The user views the cliques at step 26 and then selects a clique or cliques at step 28. Many scripts, scores, hundreds, thousands, etc. may be on the system for the user to select. The user may be able to select multiple cliques.

The system may display the cliques on the user's computer display, or on the user's phone (and/or pda). After the user has selected the clique at step 30, the system offers a menu of parameters to control contact from the clique. The user views the parameters at step 32 and at step 34 can set call control parameters, including the start time, date for calls, frequency of calls, maximum duration or end date (or open-ended like a soap opera), number(s) at which to be contacted, priority of dialing contact numbers, etc. The system, at least for some scripts containing text messages, picture messages or video messages, require a cell phone or equivalent number (a number for a device capable of accepting such types of calls) and may also require a land line number for other calls, such as audio only calls, to further simulate real life, wherein friends call users on various phone numbers.

After the user sets call parameters at step 36, the system makes calls to the user. The user receives the first and all subsequent calls according to those parameters. For simplicity, the user may select a clique using the internet to access the selection module of the server side. Call cliques could also be selected from a phone, e.g., using a push button selection menu, a pda (personal digital assistant device), a device such as an "I-Phone®" or "Blackberry®" or other means. While embodiments of the inventive system and method are preferred with a phone with video, it is not required and/or may be required for some scripts, and/or some scripts may require multiple phone numbers for multiple receiver devices. In some embodiments, there may only be one phone needed and it may be audio only. The recordings (the scripted calls) are best embodied with video and audio, but they too may be audio only, and as noted above, may also include interspersed with the audio and/or audio with video recorded segments, one or more text messages, picture messages, and/or video.

Figure 3:
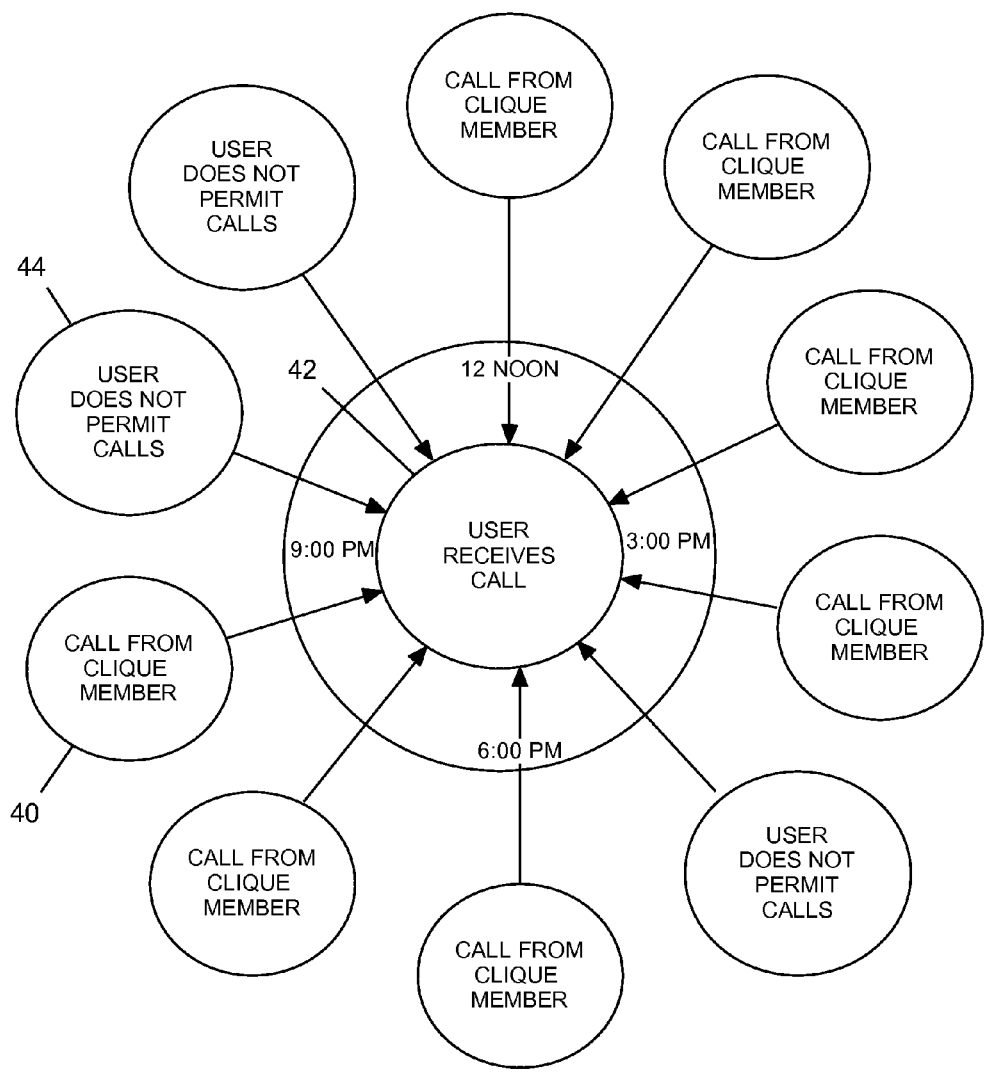
FIG. 3 is a schematic diagram of an embodiment of the user side passive mode call module of the inventive system.

As stated previously, clique calls can be received passively, in a manner that does not affect the outcome of the script, or interactively, in a manner which does affect the outcome of the script. FIG. 3 shows a call module of the user side in passive mode for a sample day of clique calls e.g. from A. While the clique calls can continue for multiple days, weeks, months or even longer, one day is shown for the sake of clarity. User 42 has set call parameters (from step 34, FIG. 2), e.g., for accepting calls on this date, at the times indicated by clock position, and at a certain phone or phone numbers (or other contact devices) as noted in the diagram. The user receives calls 40 from different clique members, normally one call at a time, throughout the day. (A conference call or call from two clique members is possible too.) The time periods 44 when the user is not available to take calls are set in the time parameters, discussed previously, so that no calls are generated during those intervals. Subsequent days may have more or fewer calls. Some days all clique members may call. Other days, only some clique members may call. The programming preferably will enable scheduled calls to go unanswered and be stored for use at a later time—in the same way that regular calls that go unanswered are stored and can be accessed at a later point through voice mail.

Figure 4:
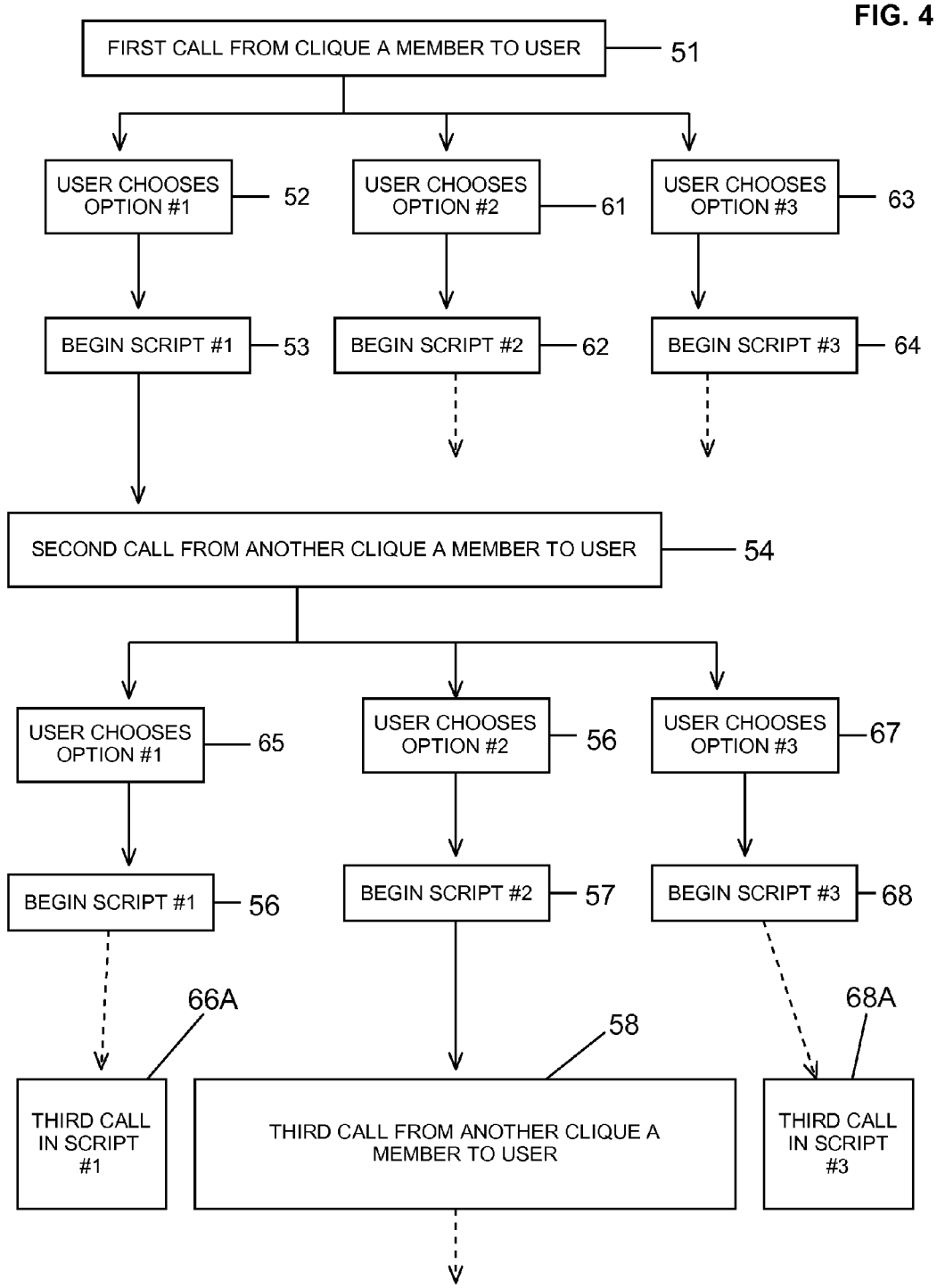
FIG. 4 is a schematic diagram of the user side call module of the inventive system.

FIG. 4 shows the call module of the user side in interactive mode for a sample day or days of clique calls. Of course, interactive mode is simply one version of the invention. The server need not be operated in interactive mode, and the user need not use in interactive mode.

With reference to FIG. 4, the user receives a first call 51 from a member of the chosen clique in the story. The call may be the very first call from the clique or may be a later call. Options are offered to the user during the call, requiring the user to make a choice among options. The user keys in or speaks the choice, which alters the script progress and outcome.

If option #1 is selected (step 52), a script #1 a step 53 begins, and the user receives a second call at step 54. If option #2 is selected (step 61), then script #2 begins at step 62 and the user will receive a call. If option #3 is selected (step 63), then script #3 begins at step 64 and the user will receive a call in accordance with script #3. In script #1, there may be additional options following step 54, where the user may choose any of the new options #1, #2, #3 (steps 65, 56 or 67) which would cause further scripts #1, #2, or #3 (steps 66, 57 or 68 respectively). As an example, a third call at step 58 would be received after further script #2 begins. A different third call for further script #1 would be received at step 66*a*, or a different third call for further script #3 at step 68*a*. Each call offers the user some influence to alter the script and to affect the ultimate outcome, or only a select number of calls offer options for the user to select. User selections could be made in another manner as well, such as via a web site. The calls are preferably delivered along a predetermined series or predetermined series although the user's input will then determine which branches of the predetermined series are followed.

FIG. 5 shows a table 70 depicting content interrelation among clique members and timing of clique calls. Each clique member (i.e., each fictional or make believe friend, A1 to An, e.g., A5) calls at a specified time (or at least in a sequence that is preferably pre-set) and delivers an element of the scripted story. In their calls, the clique members often refer to one or more other clique members and preferably most all or at least some calls do so. The clique members may complain about other clique members, offer advice, give warning, question, introduce and recount details of the other clique members, common events and common issues and provide other call content. Essentially, the clique members together deliver all the elements of the script or story, which are many of the elements found in compelling stories. The clique members' calls preferably refer to and/or address the user and speak to the user as if they know the user, e.g. A1 calls and says: "Hey you" or "I miss you," or "I wish you were here," and/or "A2 said she saw A4 and had lunch with her—why didn't they call me?," and/or "Did A4 tell you about that?"

Of course, A5 could make the first call or A3 could or any clique member. In a more sophisticated version or versions, a user's name could be personalized into the calls, e.g., by synthesizing the user's name in the clique member's voice, or by each clique member recording a long list of possible names with the system controller then inserting the names at the appropriate times or other means. Whatever way, the user would select his/her name when setting up the calls in the module of FIG. 2.

"Script" as used herein is defined as "The text of a play, broadcast, or movie." "Story" as used herein is defined as "an account or recital of an event or a series of events, either true or fictitious [as an] account or report regarding the facts of an event or group of events." (The American Heritage® Dictionary of the English Language, Fourth Edition copyright ©2000 by Houghton Mifflin Company. Updated in 2009. Published by Houghton Mifflin Company. All rights reserved.) The story would thus have a plot or plots, as in any story.

Figure 6:
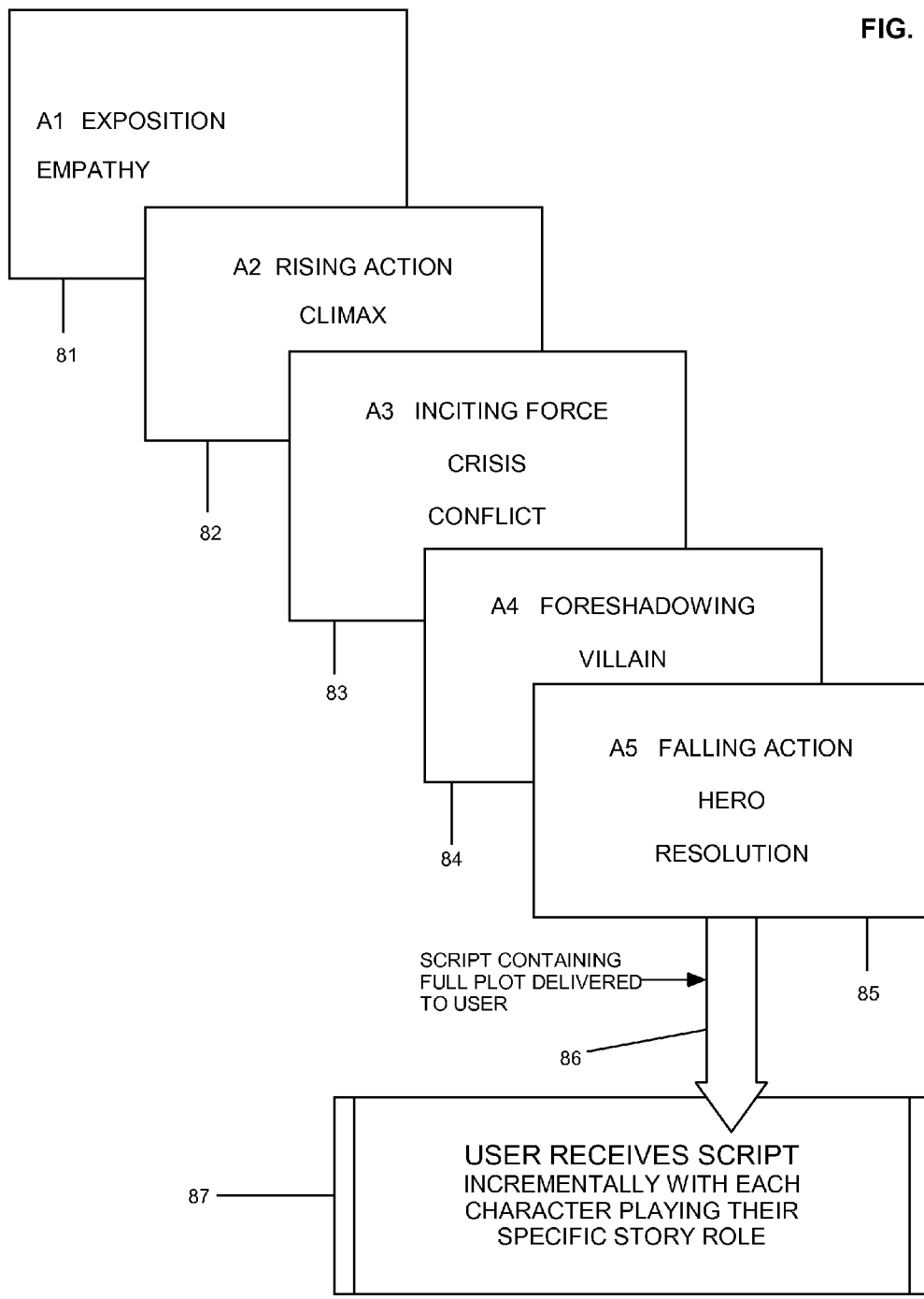
FIG. 6 is a diagram of clique dependent content and interrelation of a script from a user perspective.

FIG. 6 shows a diagram of the content interrelation of calls in a selected clique or set of calls. Over the life of the calls being made to the user, preferably the user receives a complete script or story. That script preferably contains many, if not all, of the elements e.g., elements 81-85, of a compelling story including exposition to give setting, create tone, present clique members, and other facts necessary to understanding the script such as: foreshadowing; an inciting force that triggers conflict; conflict; rising action which builds from the conflict; crisis; climax; falling action after the climax; and resolution of the conflict. Each member of the clique delivers some element of such a compelling story which together creates the script for that clique. No one clique member delivers all elements but a clique member may deliver more than one element. The concept is that a story is being told in the "first person" perspective from multiple points of view. That the script is delivered to the user (shown by arrow 86) and that the user receives the script (shown by box 87) refers to the user receiving the calls and/or texts and/or messages that make up the scripted story content.

Therefore, the calls in a clique interrelate to prior and/or future calls in the clique by at least some calls referring to other clique members, and/or referring to the same events and/or story line and/or same subject as other calls, such as A3 saying "A1 called me last night and said . . . ," and/or A4 saying "I went to the store yesterday with A2 who told me . . . ," and/or A1 calling and saying "I went to the store with A5 yesterday, and A5 told me a whopper about A4." The story unfolds through character's reference to others by name; recalling an incident; relating an experience that happened to the fictional friends between calls; referencing other calls that presumably transpired between the fictional friends that did not include the user; references to other fictional characters in the fictional character's family and other life environments; social and/or historical events that are either fictional or related to real world experiences (i.e.: references to 9/11 would echo real life experiences of the user while references to "the incident in Alaska" would be fictional references for the sake of exploitation within a story line); or other scenarios that might arise within the crafting of any story. In essence, each call from a fictional friend would advance a story line, reveal character dimension or serve the sole purpose of offering an amusing observation or interlude amidst either of the first two purposes.

Figure 7:
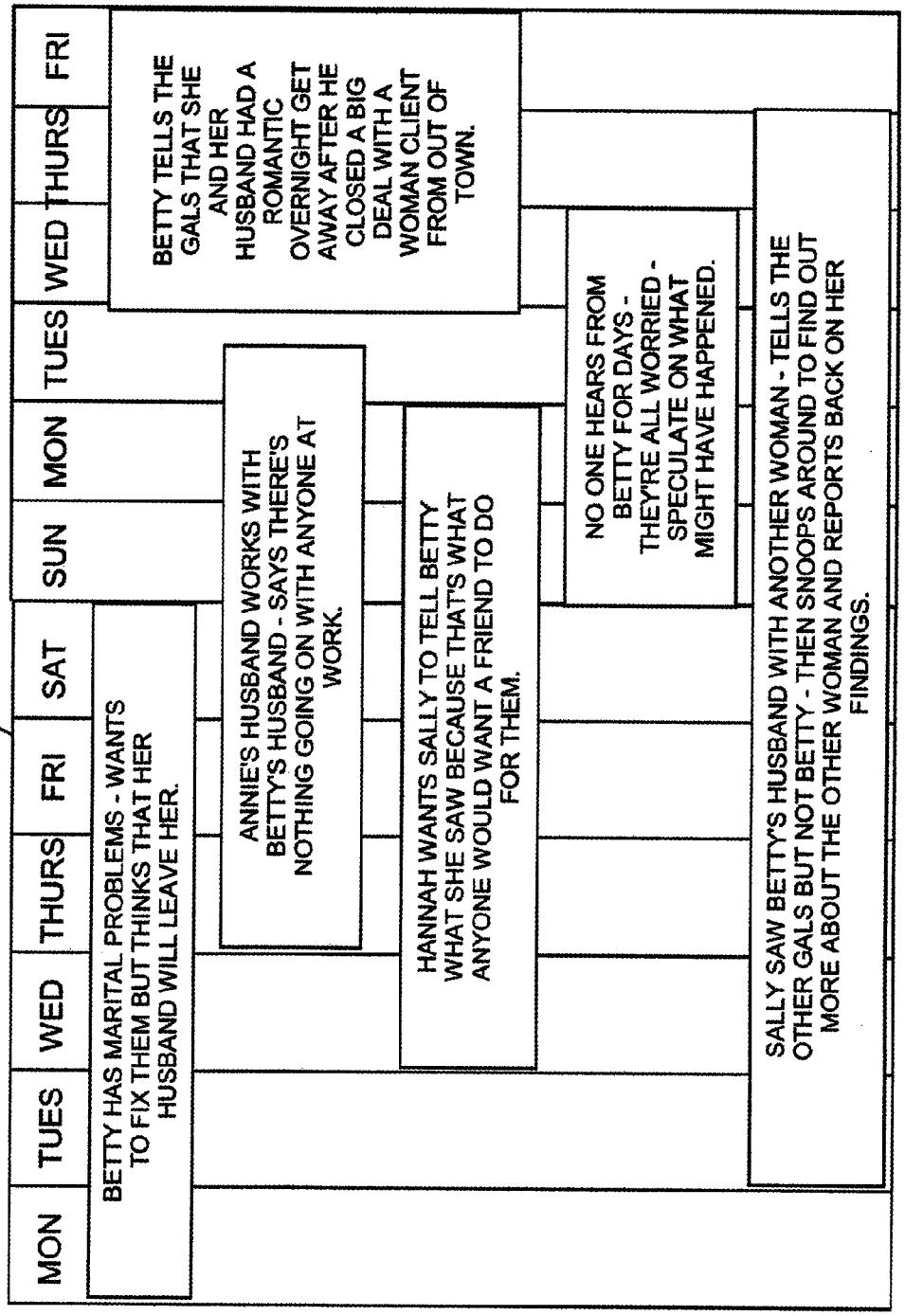
FIG. 7 is a diagram like that of FIG. 5 but providing more detail regarding interrelations and plot (sample story flow 1)
Figure 8:
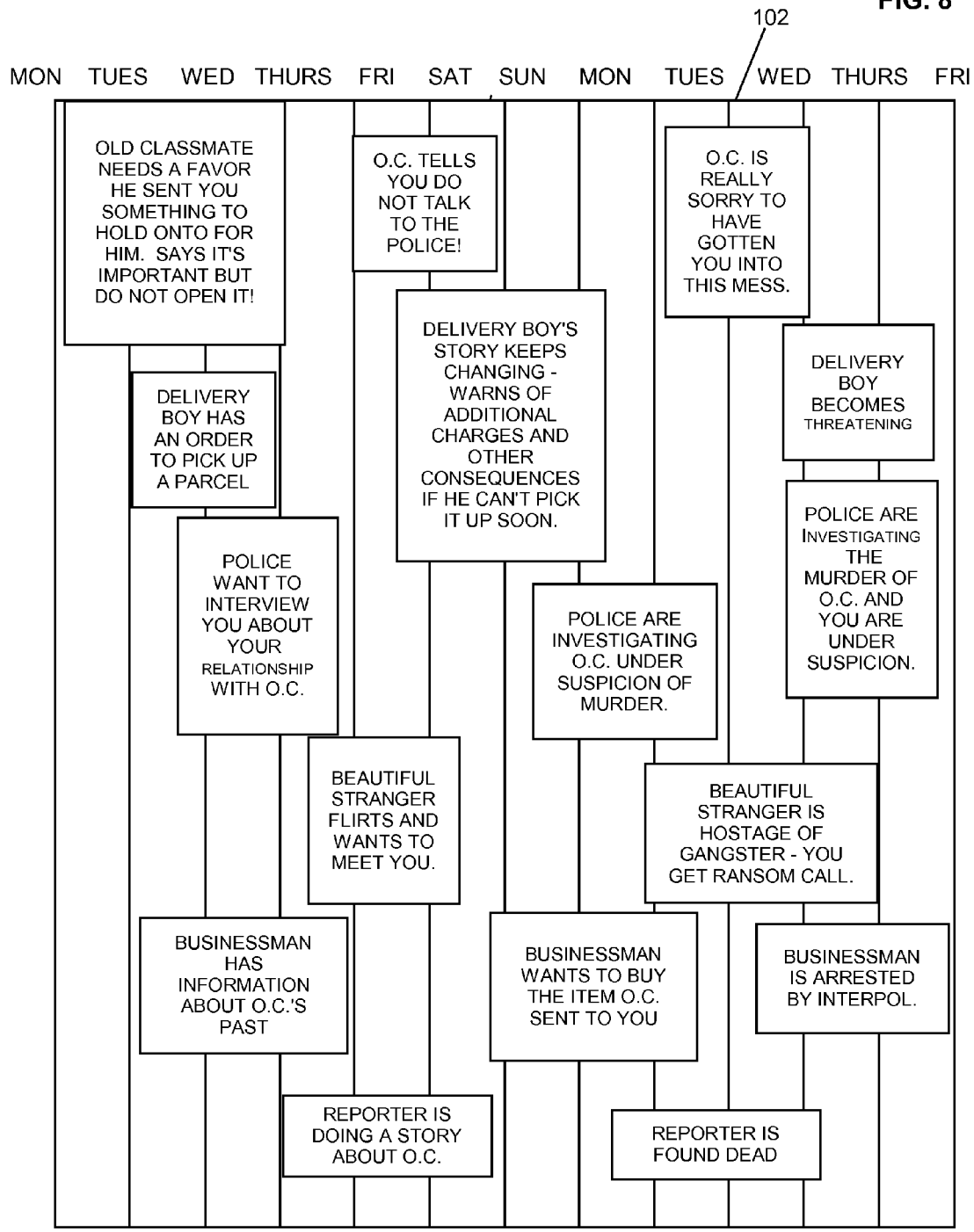
FIG. 8 is a diagram for demonstrating sample character types and genres and variations thereon (sample story flow 2—complex combination in genre)
Figure 9:
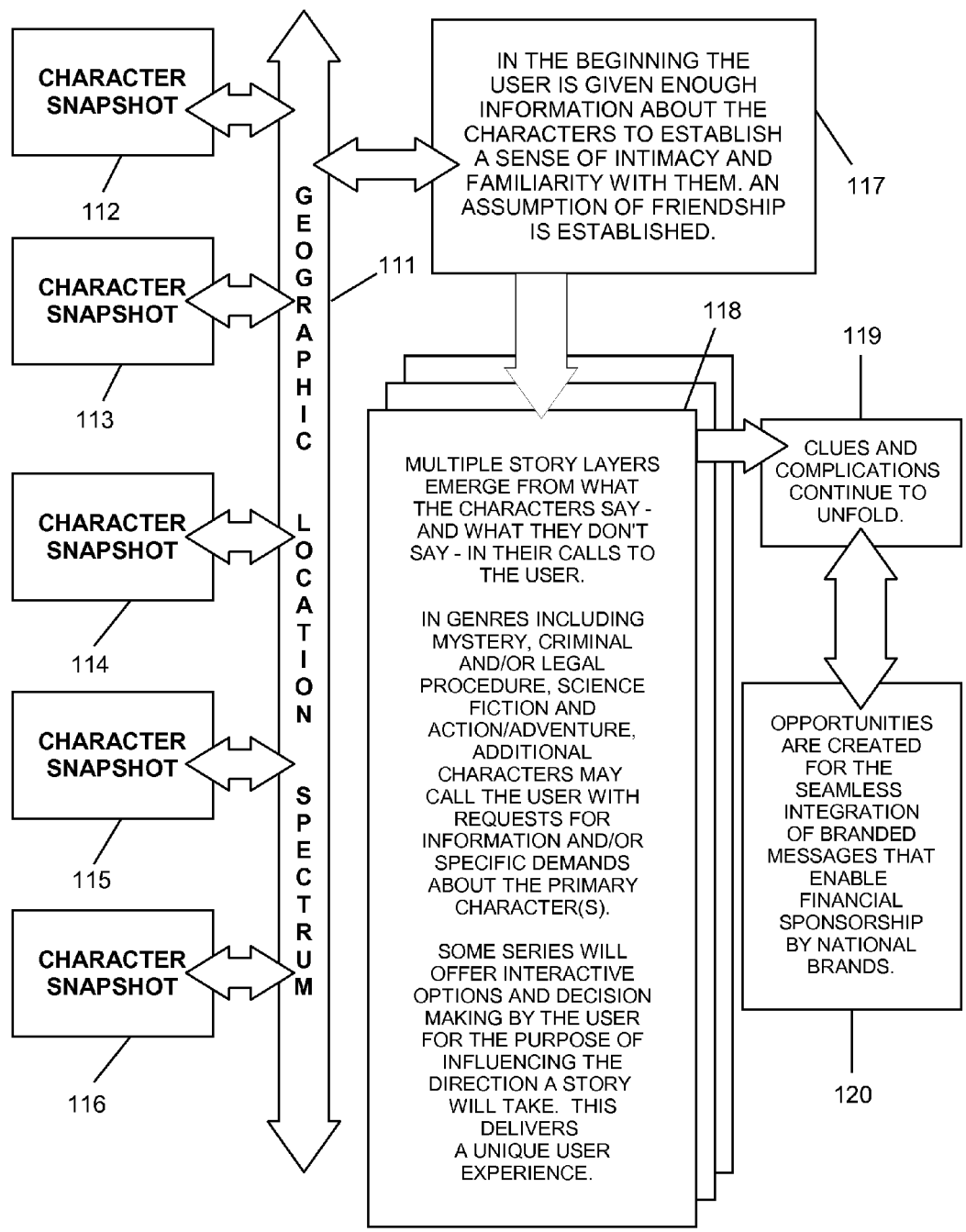
FIG. 9 is a diagram showing how characters, e.g., five characters, could be displayed.

For FIGS. 7-14 below, the layout and text in each figure is self-explanatory. (Copyright is claimed by the inventor in all the Figures, and most particularly FIGS. 7-12.) FIG. 7 is a diagram like that of FIG. 5 but providing more detail regarding interrelations and plot (sample story flow 101). FIG. 8 is a diagram for demonstrating sample character types and genres and variations thereon (sample story flow—complex combination in genre 102). FIG. 9 is a diagram showing how characters, e.g., five characters, could be displayed (with a picture and brief description or just a brief description called "Character Snapshot") e.g., for character selection or just for display to a user in order to select a clique, a geographic location selection, and a general description of how stories would progress (Characters Within a Defined Genre Targeted to a Specific Demographic). The user may be provided with an option to select a geographic location, e.g., "Los Angeles" for the story from a "geographic location" spectrum 111, and then selects characters from the character snapshots 112-116, for example, associated therewith. Then at steps 117, 118, 119 and 120, the story is transmitted and displayed to the user. The scripts available for the Los Angeles area might then refer to locations in Los Angeles, and for added realism the calls may actually be placed from numbers having greater Los Angeles area codes. For further realism, each of the phone numbers would be active, with an outgoing message from the character—thereby giving the user an opportunity to leave a voice mail for the character.

It should be noted that the geographic spectrum chart is preferably a spectrum of locations from which the characters will be calling, e.g., one of the characters might always be calling from exotic locations for work—which would be a factor in the clique choice. Another character might be living life from a hospital bed. So, this is preferably not a choice module—although it could be if we shot on green screen and plugged locations in (which we will do anyway).

Figure 10:
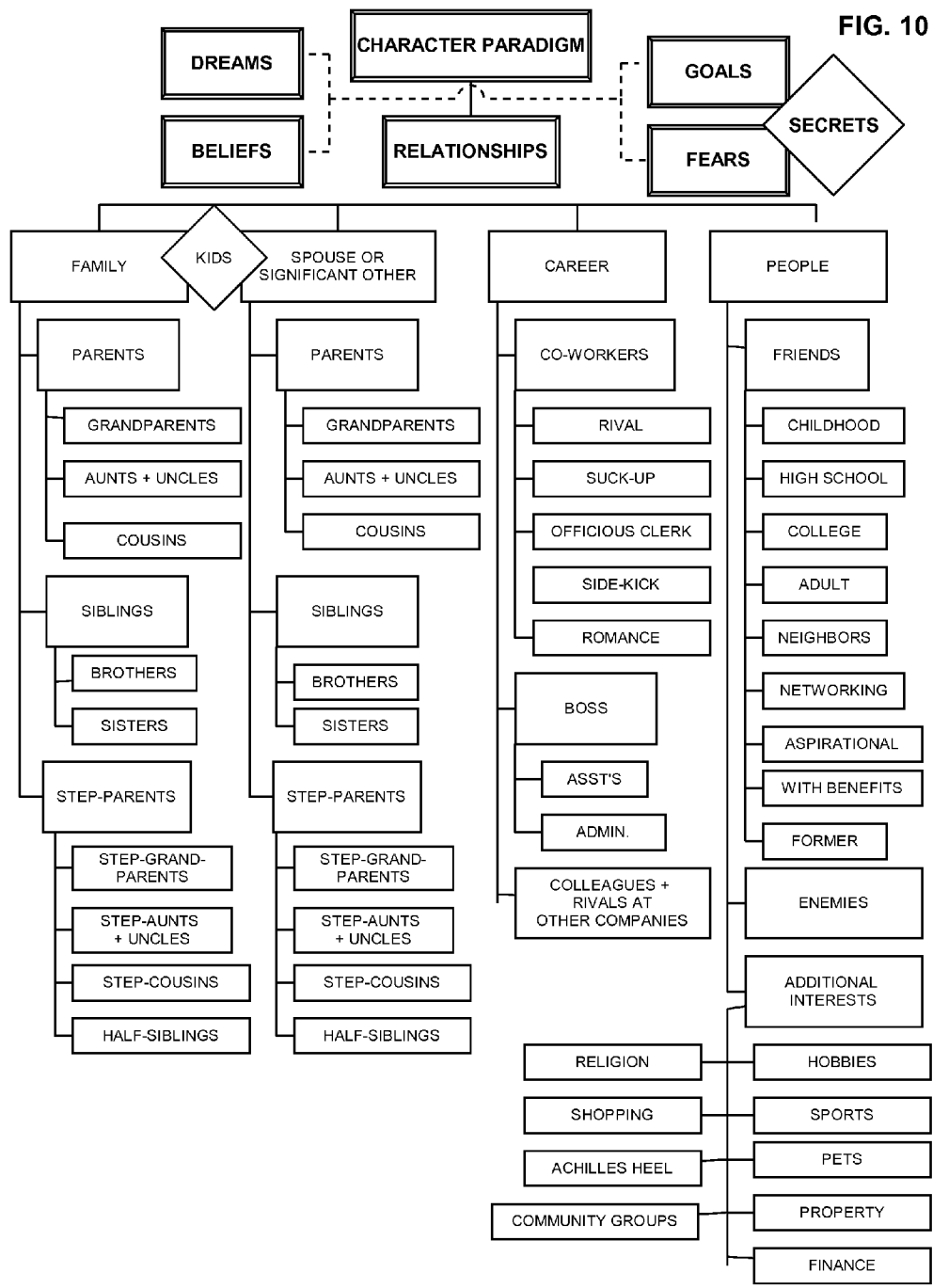
FIG. 10 is a diagram for demonstrating different types of characteristics of characters and how characters can relate ("Character Paradigm")
Figure 11:
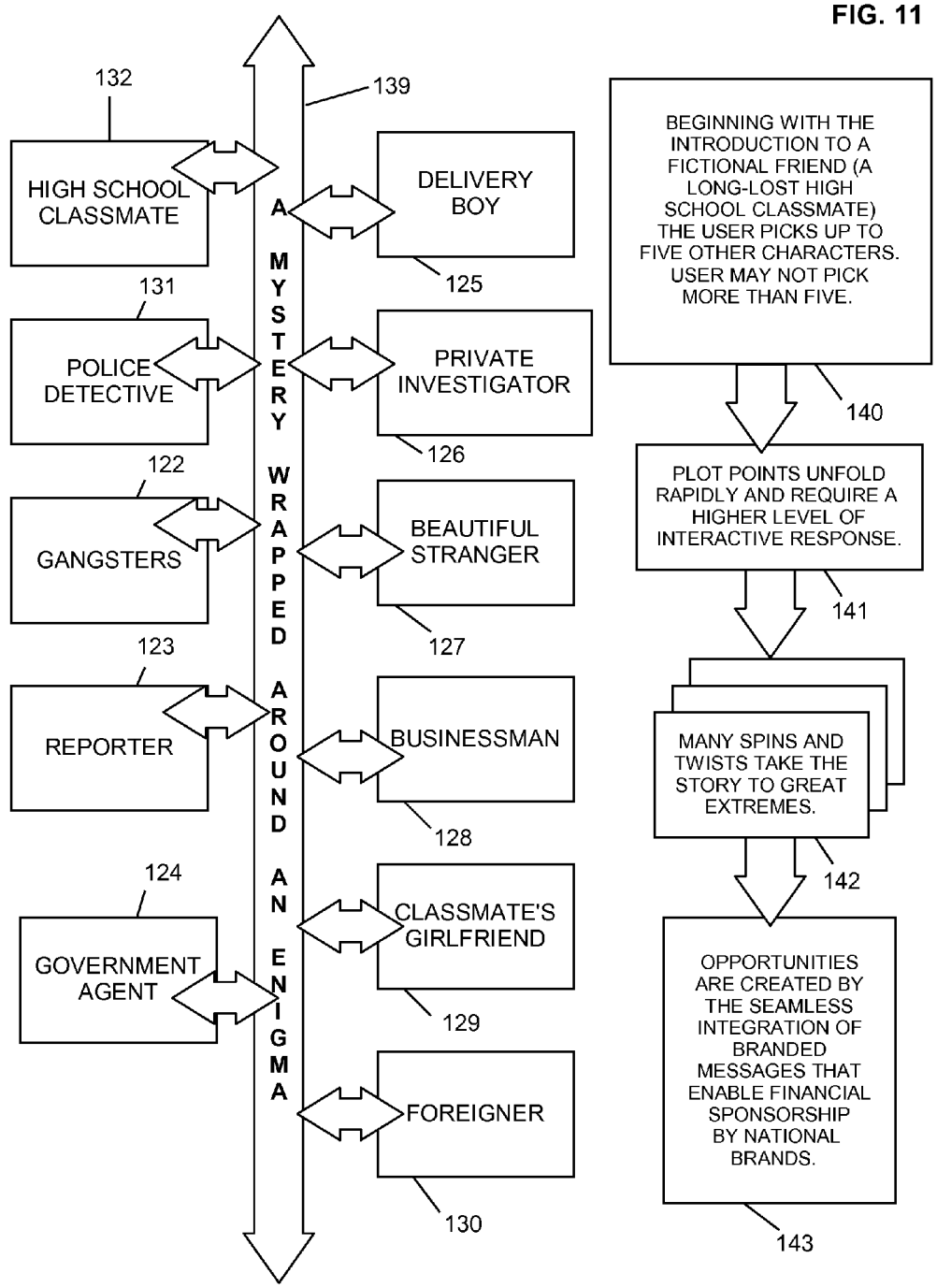
FIG. 11 is a diagram like FIG. 9 but providing examples of character descriptions (e.g., "high school classmate) (character menu for genre series with complex combination variations)
Figure 12:
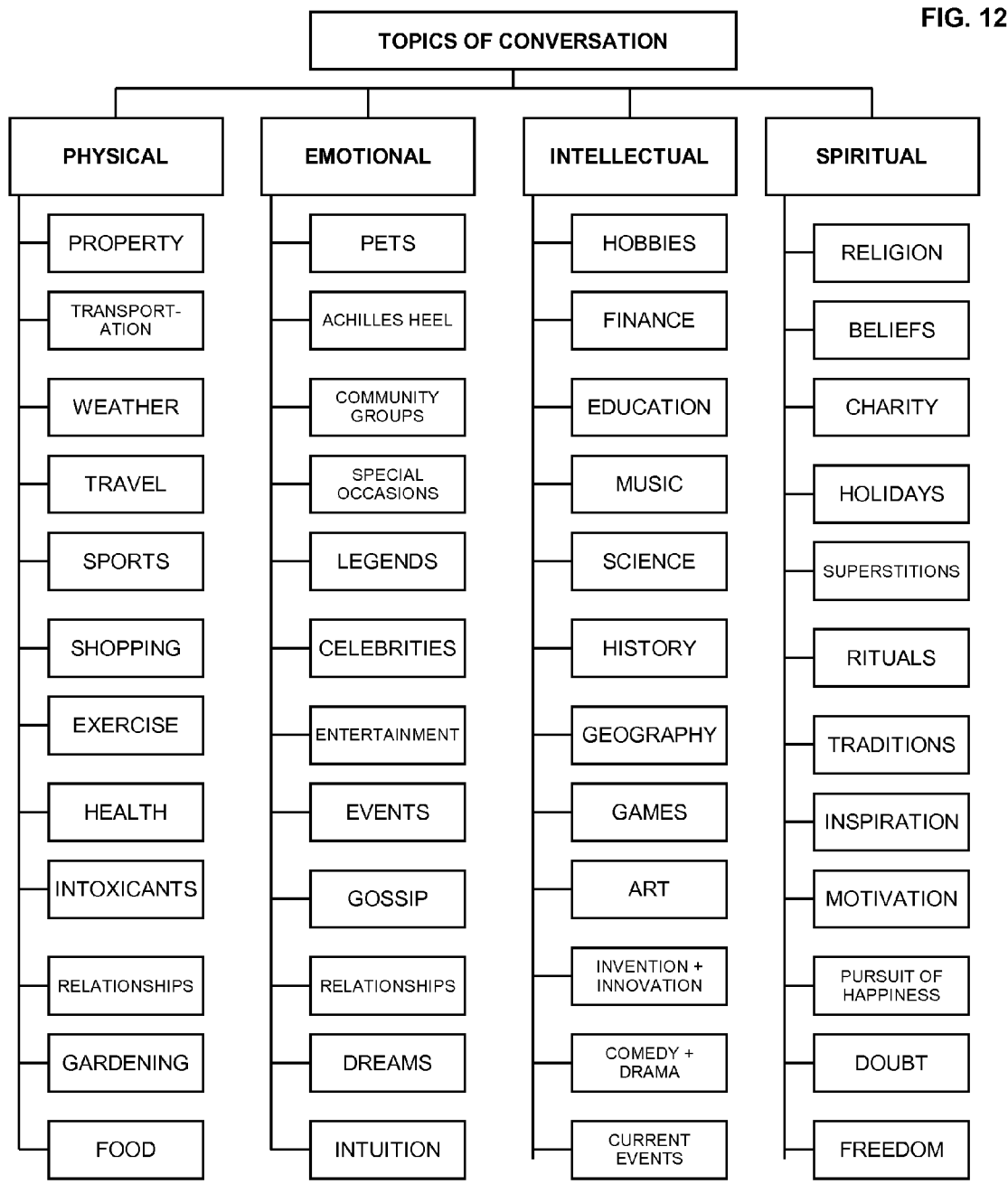
FIG. 12 is a diagram showing various topics of conversation for the characters.

FIG. 10 is a diagram for demonstrating different types of characteristics of characters and how characters can relate ("Character Paradigm"). FIG. 11 is a diagram like that of FIG. 9 but providing examples of character descriptions (e.g., "high school classmate)(character menu for genre series with complex combination variations). In this or an advanced embodiment, a user at set up may select character types (e.g., "Foreigner" or "Government Agent") 112 to 132 for himself/herself and/or for the characters in the clique, and/or the user may select story genre along a story genre spectrum 139 (which has the characters associated therewith). Alternatively, this diagram or these diagrams may be used to generate a story and clique by the entity that creates content for the system. FIG. 11 also presents examples of how the plot may be created to be interesting and also to include branded messages for financial sponsors. Once genre and characters are selected, the story unfolds at steps 140, 141, 142, 143 during a series of calls made by the system. FIG. 12 is a diagram showing various topics of conversation for characters. All of the conversation and plot points will come from one or more of these topics in infinite combinations. In step 143, opportunities for sponsorship may include not only local, regional, nation or international brands, but also NPOs and PACs (non-profit organizations and political action committees) as well as other third parties.

Figure 13:
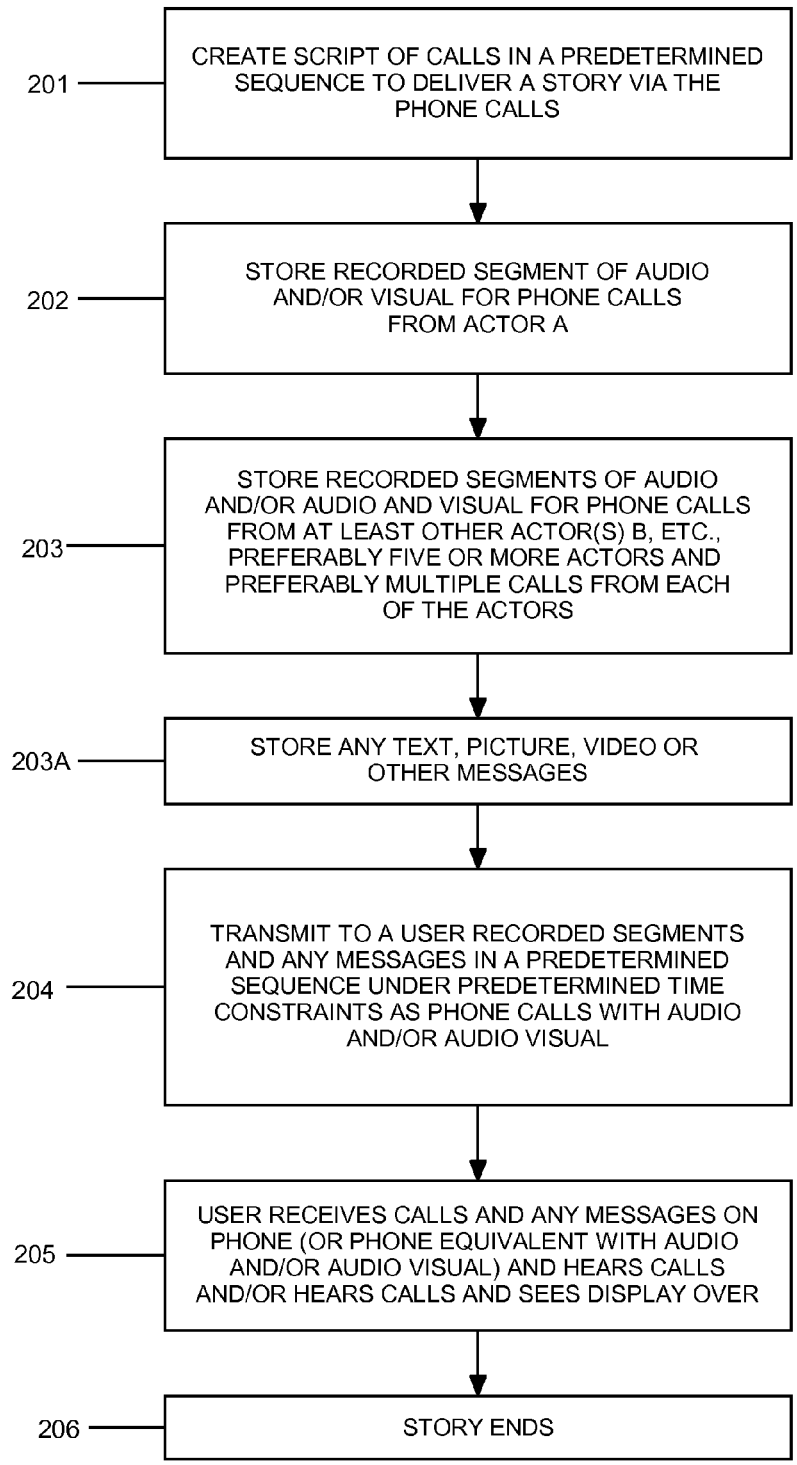
FIGS. 13 and 14 are flow charts of steps in preferred embodiments of a process, FIG. 13 being passive and FIG. 14 being interactive where a user selects options for calls.

As shown in FIG. 13, various steps in a process in accordance with preferred embodiment(s) are shown. At step 201, one creates or obtains a script of calls having a plot in a predetermined sequence to deliver a story via phone calls. At steps 202 and 203, actor(s) record each segment (call) in the scripted story is recorded. Preferably, there are multiple actors, at least two and most preferably five, so the step involves storing recording segments of audio and/or audio and visual (and/or create text message and store it) from at least one other actor B (or more, e.g., most preferably five actors). Preferably, the plot or story line involves multiple calls from each of the actors, and the call subject matter will interrelate and form the plot. The calls are preferably audio and/or audio visual. At step 203A, the system may store any messages, e.g., text messages, picture messages or video to be sent as part of the script or story. At step 204, the calls (and any messages) are transmitted by the system to the recipient/user in the predetermined sequence over the course of a day or days in the form of phone calls, to a device of the recipient. At step 205, the user receives the calls (and any messages), e.g., at his/her phone number, and hears and/or hears and sees them on his/her phone (or phone equivalent device), the audio being transmitted and played on the audio transducer, and any video being displayed on a screen associated with the phone or phone equivalent.

The story may vary from a few phone calls to many phone calls, and the length of the calls may vary from a few seconds to many minutes or longer. As in real life, most calls in a script would typically be made by one actor at a time, but some calls could be made by multiple actors, such as when two friends together call a third friend. Some scripts may even have conference type calls. After the sequence of calls forming the story end, at step 206 the story ends. The user may then select a new script. The user could also select multiple scripts at a time, and be receiving calls from various stories in an overlapping time period.

Figure 14:
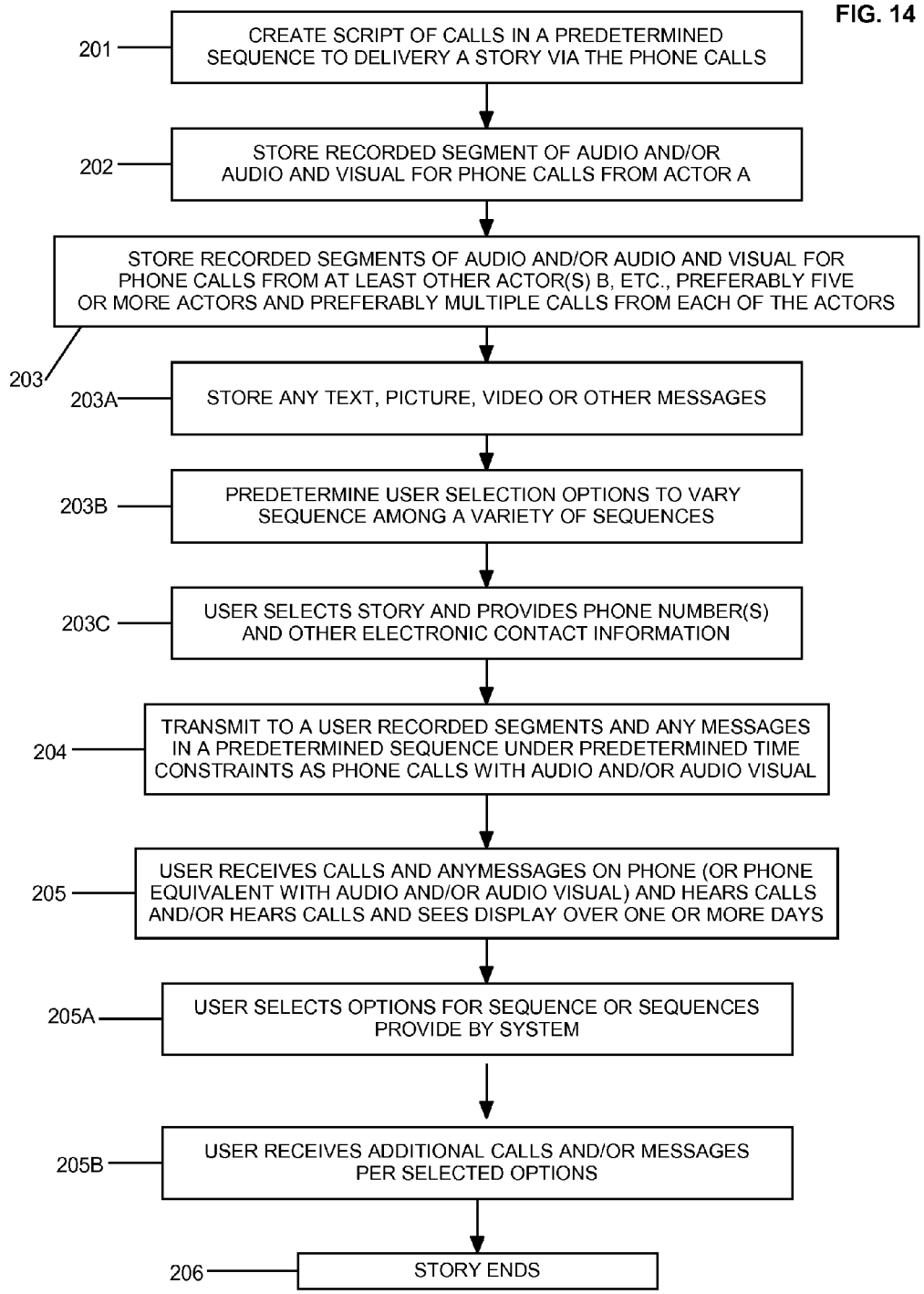

FIG. 14 is similar to FIG. 13 but contains additional options for the interactive mode. Steps in FIG. 14 having like reference numbers to steps of FIG. 13 are the same. At step 203b, user selection options are determined or have been predetermined such that the stored or recorded segments and messages can be delivered in a sequence based on user selection. At step 203c, the user selects a story (from multiple available stories) and provides appropriate phone number(s) and/or other contact information to the system. This step can also be performed in the process of FIG. 13. At step 205a, the user selects options for the sequence or sequences being provided by the system (e.g., as explained and shown in reference to FIG. 4). At step 205b, the user receives the calls (and any messages) in the order per the user selected option(s).

Figure 15:
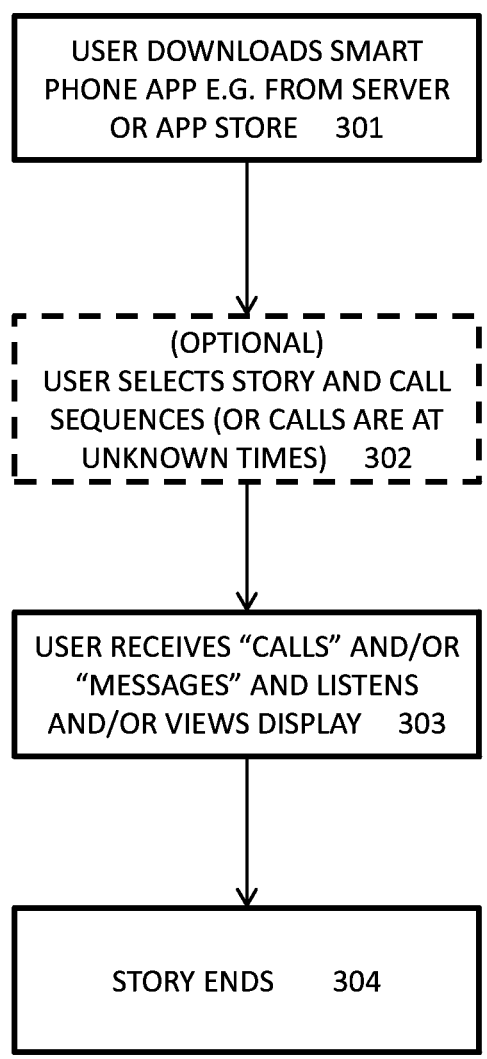
FIG. 15 is a flow chart of steps in another preferred embodiment of the process where the user downloads a smart phone application which initiates the calls.

FIG. 15 is a flow chart of steps in another preferred embodiment of the process where the user downloads a smart phone application (the App), which may include in the same step or by separate step (e.g., opting in to receive a story or stories), downloading a story or stories. See step 301. The user then loads the App and may select a story (if more than one is available) or optionally select a story and call sequence. See step 302. The calls and messages may alternatively or part of the time come at unknown and/or random times to add to excitement.

Then the user receives the calls and messages, if any. The calls, as above, are preferably video calls. However, they may be or may include simple voice calls. The messages, if any, are preferably text messages, and may or may not have attachments or embedded pictures and/or video and/or voice messages. See step 303. The story may end after a designated period of time or it may be ongoing without a terminal point. If there is a terminal point, then the story ends there. See step 304.

Various alternatives in the above embodiments may or will apply to this embodiment as well. The App may be a push notification application. Push notification allows an app to notify a smart phone user of new messages or events (e.g., "calls" or "messages" from members of the clique) without the need to actually open the application, similar to how a text message will make a sound and pop up on one's screen.

In a more preferred embodiment, the calls are either actual calls carried on the airwaves or they are wireless signals downloaded via infrared wireless or the like, and played on the phone simulating a call. They may even simulate a ring and answer sequence in order to play the call. It is also an option for the smart phone's own processor and memory to be used to store each sequence of calls, and possibly settings and timing of the calls, although the appearance of randomness is preferred. In receiving the calls, the App may actually make the "call." However, in this iteration it is not an actual phone call, i.e., none of the call is carried over phone lines or airwaves. Instead, it is a simulated call generated by the smart phone processor at the appropriate time. Yet, if one wanted to use the App and have the phone calls come over the actual phone lines or airwaves, one could do so.

The App may only temporarily store a call segment or message, and automatically delete it after it is played on the phone.

The App may be downloaded, as in FIG. 15 step 301, from an app store 400 or from a web site 399, or obtained by other means such as by an email or hard drive. The web site 399 may be one of multiple web sites, some of which may contain third party advertising, or just one web site which may interweave third party advertising into the story, e.g. before or after a call or message or onto the smart phone.

Figure 16:
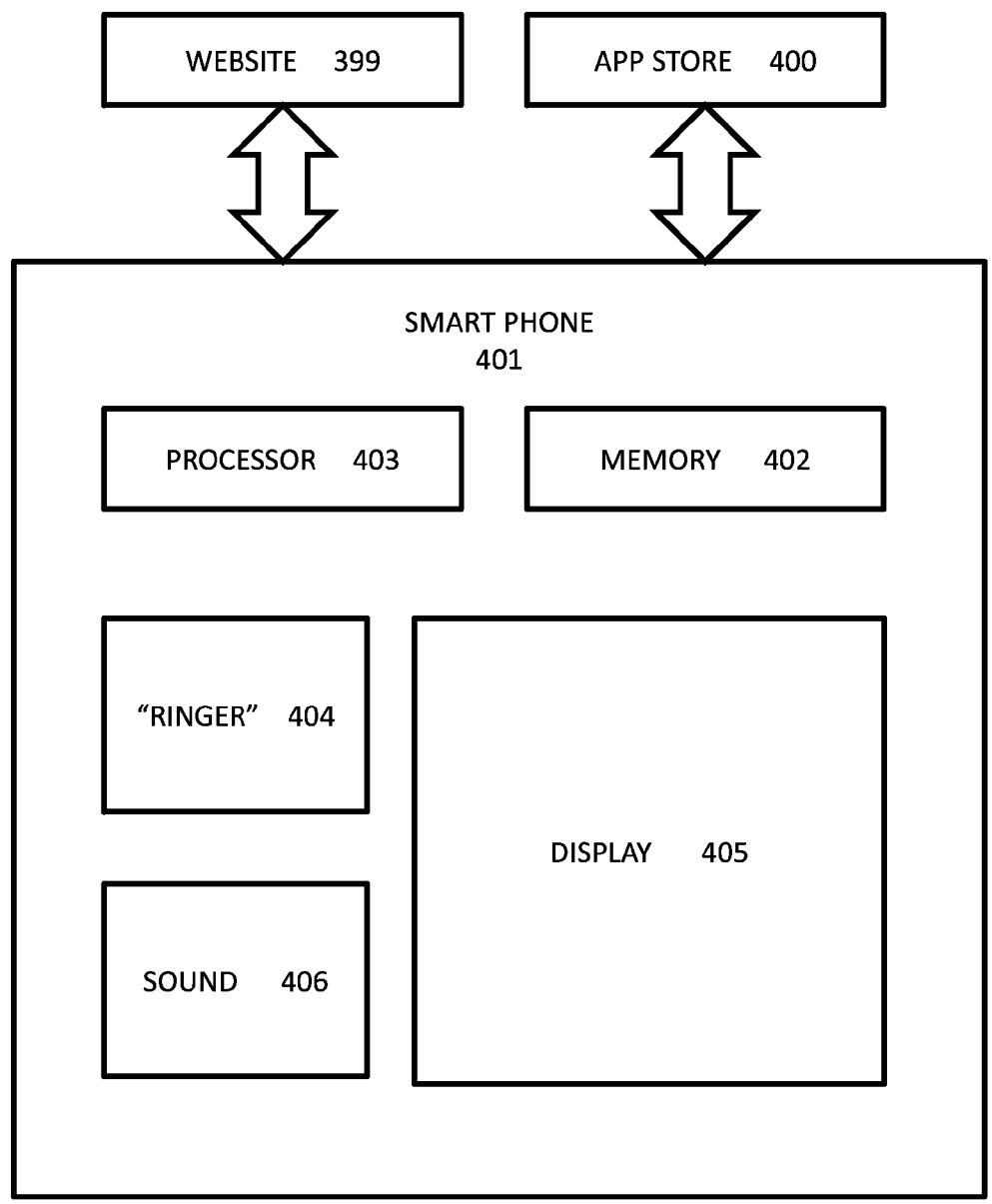
FIG. 16 is a schematic view of a smart phone and its interaction with an app and/or with a main system such as that of FIG. 1.
Figure 17:
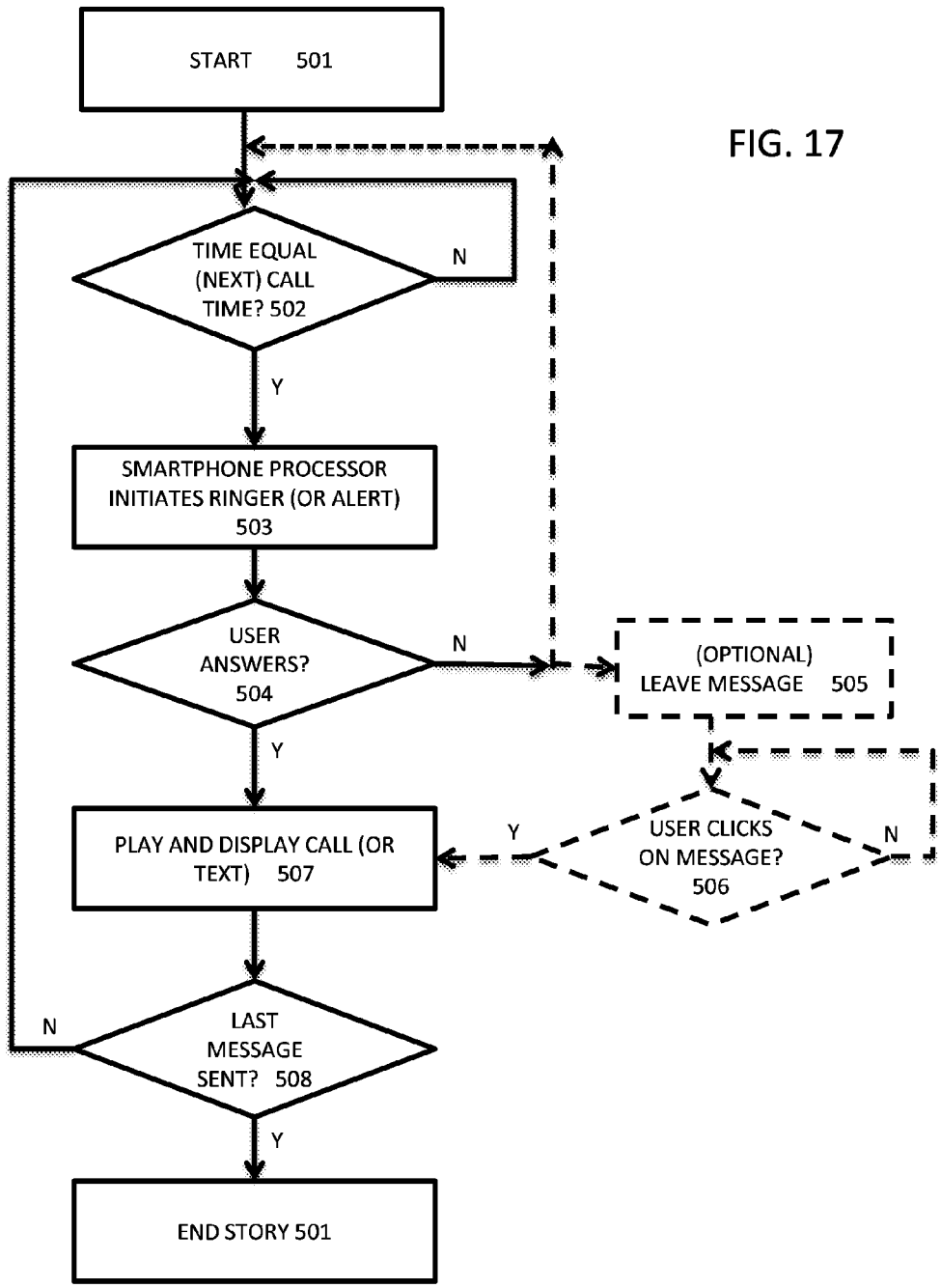
FIG. 17 is a flow chart of additional steps in a variation of this preferred embodiment.

The App may itself be created using the same system as in FIG. 1. With reference to FIGS. 16 and 17, upon downloading the App, smart phone processor 403 would store it in smart phone memory 402, along with any story (sequence of calls).

The App may use push notifications. If the user enables notification, then the user will automatically be notified (by sound, onscreen alert, "badge" which is an icon with a number in it or other means). The notification could therefore correspond to the next "call" or message in the story. The user would then click an icon to receive the call or message. The phone's processor can then start playing the call or can simulate a call coming in, requiring the user to answer the call as the user would answer any call on the phone. Another option would be that the user calls a number or sends a text to a specified alphanumeric code or the like, or just clicks on an icon to receive the call or message.

The processor 403, when the time in the phone matches the time for a next call, sends the notification (if a push notification) to make the call. Alternatively, the processor makes the call by initiating "ringer" 404 to play an appropriate ring tone (or to provide an alert e.g., for a text or video or voice message), which sound may be played by the speaker or sound device 406 of the phone. See steps 501, 502 and 503. If the user answers at step 504, then the processor will play sound at smart phone speaker 406 (or other sound connection such as a blue tooth device or wired ear phone) and display the call and/or message on display 405 (see step 507). If the user does not answer, then the processor will optionally leave a message (step 505), or alternatively could try again later at a predetermined or random later time.

When the user clicks on the message (step 506), the message will play, same as if the user had answered (step 507). If the last phone call and/or last message of the story has been sent and listened to the story ends. See steps 508 and 509. If not, the system returns to step 502 to the next message.

In another embodiment, at sign up or subsequently, users can opt into a geo-location feature. This feature will enable the series producers to know the general geographic location of each of their users who opt in. The users can opt into this feature at any point in the series by changing their settings to allow it. The users can also opt out of this feature at any point in the series by changing the settings to not allow it.

The capacity for geo-location provides the opportunity to transform the mobile relationship into a LIVE experience where one or more users can have direct contact with one or more of the characters in the series. This can happen on either a one time basis or enable an ongoing series of events. It can also include a LIVE Stream to every other user during the event.

If national (or regional) sponsors can determine that there is a critical mass of users in the area where their product, store or service is available, they can host a LIVE event—including but not limited to the following examples:

Something cool is going to happen in the Mall of America at 5 pm on Wednesday. (a flash concert)

Come help clean up these four streets around a school in Newark N.J. this weekend.

My friends at Taco Bell want to introduce you to their newest taco—so come have one on me by showing them the app on your phone.

We're looking for a lost kid with autism last seen in your neighborhood—please help us find him.

The option can be used to create unique on-on-one or small group experiences:

Meet me for a cup of coffee at this specific address . . . .

I have four tickets to the concert tonight. Find me at (location) and I'll give them to you.

Figure 18:
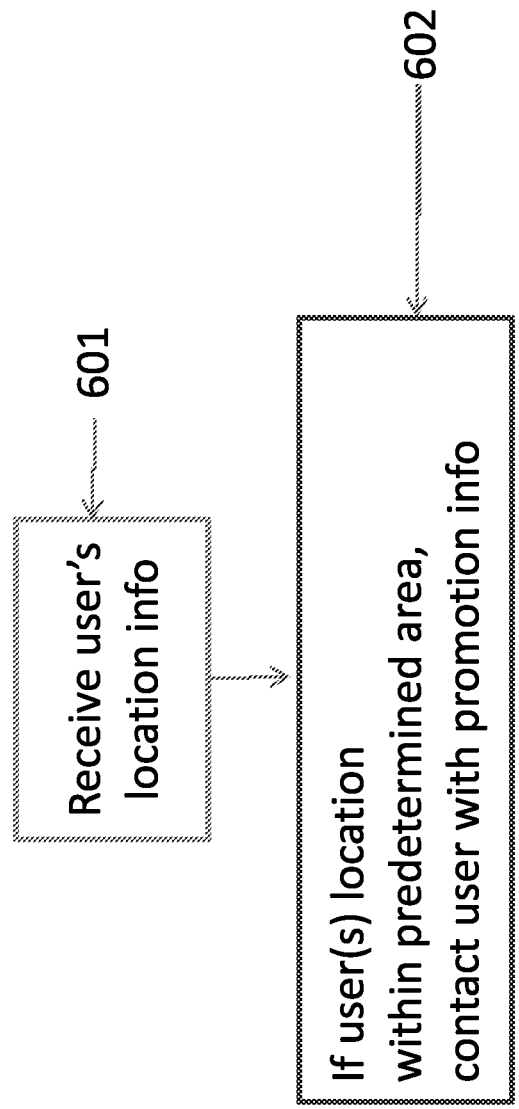
FIG. 18 is a flow chart of steps in another embodiment.

With reference to FIGS. 1 and 18, in the geo-location embodiment, users' phones are gps enabled (opt in for tracking).

The system (the CPU or processor 6) receives the phone location information at step 601 and compares it with predetermined stored location constraints (stored, e.g., in memory 4) at step 602.

If the user(s) is(are) located within a predetermined area, the system contacts the user with promotion information (stored e.g., in memory 4), e.g., as noted above.

In another embodiment, the system has a recording of a singer, songwriter, or other celebrity or well-known person or star for a promotion (independently, i.e., with or without the well-known person being part of a story delivery), and the system tracks user location (as in the prior embodiment). Operation is therefore the same as that in FIG. 18. For example, the well-known person could be a musical artist and the message sent to a user or users within a predetermined geographic location is that "I'm _____ and I'm calling you because I'm on the road, in your town, and I'm going to be at _____ in 30 minutes to sign autographs (or try out my new song, etc.). Hope to see you there."

The invention has been described using specific terms, devices, and/or methods. Such description is illustrative of the preferred embodiment(s) only and various aspects may be interchanged in whole or in part. Changes may be made to the preferred embodiment(s) by those of ordinary skill without departing from the scope of the invention of the following claims.

What is claimed is:

1. A system for delivering a story including engaging a user in a scripted, fictional story recounting events about members of a fictional clique of friends, relatives and/or co-workers of the user, comprising:

(a) a memory storing a series of at least two recorded segments having at least one of audio and audio with video, each of the recorded segments being made by a person in a group of actors;

(b) at least two of the recorded segments being made in a first person perspective by at least two different actors in the group of actors playing different characters in the clique of fictional friends, relatives and/or co-workers acting as if friends, relatives and/or co-workers of the user in accordance with a script for the fictional story;

(c) the series of recorded segments combining in accordance with the script to form the complete story recounting the events from the characters' different perspectives, where each of the recorded segments comprises an incomplete portion of the script and the story;

(d) communication means for making at least one of telephone calls and video telephonic calls to the user recipient in a predetermined sequence and transmitting the recorded segments in the predetermined sequence in accordance with the script to tell the story;

(e) a processor controlling the communication means to make the calls and transmit the recorded segments to a telephone call reception device of the user recipient such that the recorded segments will be transmitted to the user via the telephone call reception device in the predetermined sequence, and (f) means for recording the recorded segments in the memory, wherein the processor controls the communication means to make the calls and transmit the recorded segments in order to tell the story, and wherein the recorded segments provide the story to the user recipient in the first person perspective from at least two points of view, wherein in the script, the user recipient is spoken to and treated as if a friend, relative and/or co-worker of each of the characters in the clique, and wherein the calls occur over the course of days as separate calls to the user recipient recounting events from the characters' own perspective to the user recipient as if the character already knows the user recipient and as if the user recipient is in the clique, and at least some of the calls refer to friends, relatives and/or co-workers in the clique other than the caller, wherein the recorded segments relate to each other by common subject matter and are each part of a plot of the story, and there are at least five different actors in the group, such that the calls simulate what real friends do when communicating with each other, wherein the system includes a smart phone application for downloading onto a user's smart phone, and wherein there is a geo-location mechanism on the users' phones and a mechanism to receive and/or track the users' locations, enabling the system to know the geographic location of each of their users who opt in, and the system transforms the mobile relationship into a live experience wherein one or more users can have direct contact with one or more of the characters in the series.

2. The system of claim 1, wherein the smart phone includes a smart phone processor and a smart phone memory, and the processor includes the smart phone's processor, and the communication means comprises the smart phone's processor and memory.

3. The system of claim 2, wherein the memory also contains at least one of text, picture, and video messages, and the communication means also transmits the at least one of text, picture, and video message, wherein the smart phone memory contains at least one of text, picture, and video messages, and the smart phone processor initiates transmission of the at least one of text, picture, and video message during a simulated call or message to at least one of a display of the smart phone and/or a voice transmission element of the smart phone.

4. The system of claim 3, wherein the geolocation and live event broadcast to one or more users may be a one time event or an ongoing series of events, and may further include a live stream to every other user during the event.

5. The system of claim 1, wherein the system, in response to determination that there is a minimum threshold of users located within a predetermined geographic area, generates a notification to the users' smart phones of a live event, including a time and location of the event.

6. The system of claim 1, wherein the script contains at least most of the elements of a compelling story including exposition to give setting, create tone, present clique members, and facts necessary to understanding the script such as foreshadowing; an inciting force that triggers conflict, the conflict, rising action which builds from the conflict, crisis, climax, falling action after the climax, and resolution of the conflict, wherein each member of the clique delivers some element of such a compelling story which together creates the script for that clique.

7. The system of claim 2, wherein the smart phone processor provides the user recipient with options and in response to the user recipient's selection of options, the processor initiates a different sequence of transmitting the recorded segments.

8. The system of claim 1, wherein the calls are ongoing calls for days, weeks, months, longer or even open-ended.

9. The system of claim 1, wherein the smart phone's processor initiates the calls and transmits the recorded segments from the smart phone's memory to at least one of the smart phone's display and speaker.

10. The system of claim 1, the application uses push notification wherein the system transmits notices to the smart phone comprising at least one of a visual indicator, an audible alert, and a vibration to indicate that a next recorded segment of the story is available, and the user may receive the next recorded segment of the story by responding to the push notification.

11. A method for delivering a story including engaging a user recipient in a scripted, fictional story recounting events about members of a fictional clique of friends, relatives and/or co-workers of the user, comprising the steps of:
(a) using a processor, storing in a memory a series of recorded segments having at least one of audio and audio with video, each of the recorded segments being made by a person in a group of actors;
(b) at least two of the recorded segments being made in a first person perspective by at least two different actors in the group of actors playing different characters in the clique of fictional friends, relatives and/or co-workers acting as if friends, relatives and/or co-workers of the user in accordance with a script for the fictional story;
(c) the series of recorded segments combining in accordance with the script to form the complete story recounting the events from the characters' different perspectives, where each of the recorded segments comprises an incomplete portion of the story;
(d) transmitting each one of the recorded segments to the user recipient via a telephone call reception device such that the recorded segments will be transmitted in a predetermined sequence in accordance with the script to tell the story; and
wherein the story is told to the user recipient in the first person perspective from at least two points of view, wherein in the script, the user recipient is addressed as if a friend, relative and/or co-worker of each of the characters in the clique, and wherein the calls occur over the course of days, weeks, months or longer as separate calls to the user recipient recounting events from the characters' own perspective to the user recipient as if the character already knows the user recipient and as if the user recipient is in the clique, and at least some of the calls refer to friends, relatives and/or co-workers in the clique other than the caller,
such that the calls simulate what real friends do when communicating with each other, wherein the system includes a smart phone application for downloading onto a user's smart phone.

12. The method of claim 11, wherein the smart phone includes a smart phone processor and a smart phone memory, and the method includes using the smart phone's processor as at least part of the processor, including using the smart phone's processor and memory to make the calls and transmit the recorded segments to at least one a display and a voice transmission element of the smart phone.

13. The method of claim 11, wherein the step of recording also includes storing at least one of text, picture, and video messages and the step of transmitting includes transmitting the at least one of text, picture, and video message.

14. The method of claim 11, further comprising a step of providing the user recipient with options and in response to the user selection of options, initiating a different sequence of transmitting the recorded segments.

15. The method of claim 11, wherein the user recipient provides a phone number to the system and the system transmits the recorded segments to the telephone call reception device using the phone number provided by the user.

16. The method of claim 11, wherein the recorded segments relate to each other by common subject matter and are each part of a plot of the story, and there are at least five different actors in the group, the story being at least one of lasting for months and being open-ended.

17. The method of claim 11, wherein the recorded segments are stored in the smart phone memory and where the smart phone processor initiates simulated calls by transmitting sound signals from the smart phone to the smart phone sound device and by transmitting picture or video signals from the smart phone memory to a display of the smart phone.

18. A method for delivering a story including engaging a user recipient in a scripted, fictional story recounting events about members of a fictional clique of friends of the user, comprising the steps of:
(a) providing a scripted story for at least two different actors playing different characters in the clique of fictional friends of the user, the story to be told in multiple segments via telephone calls;
(b) a first actor playing a first fictional friend of the user recording, in a memory, segments of the story recounting the events from the first fictional friend's perspective in accordance with a script for the story that moves a structured plot to the next plot point and having at least one of audio and audio with video and all of the segments being in a first person perspective of the first actor;
(c) a second actor playing a second fictional friend of the user recording, in the memory, additional segments of the fictional story recounting the events from the second fictional friend's perspective in accordance with the script for the story in a way that spins the story in a different direction and having at least one of audio and audio with video and all of the segments being in a first person perspective of the second actor;

(d) wherein a series of the recorded segments combining in accordance with the script to form the complete story, where each of the recorded segments comprises an incomplete portion of said story;

transmitting, using a processor and a transmission device, each one of the recorded segments to the user recipient via a telephone call reception device such that the recorded segments will be transmitted in a predetermined sequence in accordance with the script to tell the story; and wherein the story is told to the user recipient in the first person perspective from at least two points of view, wherein in the script, the user recipient is addressed as if a friend of each of the characters in the clique, and wherein the calls occur over the course of days as separate calls to the user recipient recounting events from the characters' own perspective to the user recipient as if the character already knows the user recipient and as if the user recipient is in the clique of friends, and at least some of the calls refer to friends in the clique of friends other than the caller, such that the calls simulate what real friends do when communicating with each other, and wherein the calls are for play on a smart phone and wherein the system includes a smart phone application for downloading onto a user's smart phone.

19. The method of claim 18, where a user recipient must download the smart phone application that works with push notification, and at least some of the calls are initiated by the processor when the user recipient responds to a push notification.

20. The method of claim 18, wherein the smart phone includes a smart phone processor and a smart phone memory, and the method includes using the smart phone's processor as at least part of the processor, including using the smart phone's processor and memory to make the calls and transmit the recorded segments to at least one a display and a voice transmission element of the smart phone, and the calls are initiated and simulated by the smart phone processor.

* * * * *